(12) United States Patent
Sharp et al.

(10) Patent No.: US 8,549,785 B2
(45) Date of Patent: Oct. 8, 2013

(54) PISTOL COCKING ASSISTIVE DEVICE

(71) Applicants: Lawrence C. Sharp, Bethany, OK (US); Robert H. Frantz, Oklahoma City, OK (US)

(72) Inventors: Lawrence C. Sharp, Bethany, OK (US); Robert H. Frantz, Oklahoma City, OK (US)

(*) Notice: Subject to any disclaimer, the term of this patent is extended or adjusted under 35 U.S.C. 154(b) by 0 days.

(21) Appl. No.: 13/860,225

(22) Filed: Apr. 10, 2013

(65) Prior Publication Data

US 2013/0220105 A1    Aug. 29, 2013

Related U.S. Application Data

(63) Continuation of application No. 13/197,974, filed on Aug. 4, 2011, now Pat. No. 8,438,774.

(51) Int. Cl.
*F41C 27/00* (2006.01)

(52) U.S. Cl.
USPC ............................................................. 42/90

(58) Field of Classification Search
USPC ......... 224/192, 193, 198, 199, 238, 239, 243, 224/244, 911, 912; 211/64, 66; 89/1.4; 42/90; 114/218
See application file for complete search history.

(56) References Cited

U.S. PATENT DOCUMENTS

| 23,894 | A | 5/1859 | Allen |
|---|---|---|---|
| 56,806 | A | 7/1866 | Scripture |
| 105,236 | A | 7/1870 | O'hara |
| 400,812 | A | 4/1889 | Wilson, Jr. |
| 511,326 | A | 12/1893 | DeLong et al. |
| 523,273 | A | 7/1894 | Fouts |
| 564,012 | A | 7/1896 | Fraser |
| D29,919 | S | 1/1899 | Tremble et al. |
| D30,652 | S | 5/1899 | Pardee et al. |
| 630,984 | A | 8/1899 | Lovell |
| 779,710 | A | 1/1905 | Henderson |
| 857,121 | A | 6/1907 | Shryock |
| 908,704 | A | 1/1909 | Sprinkle |
| 1,094,262 | A | 4/1914 | Spangenberg |
| 1,116,142 | A | 11/1914 | Slocum |
| 1,137,381 | A | 4/1915 | Burket |
| 1,141,257 | A | 6/1915 | Norton |
| 1,146,801 | A | 7/1915 | Spies |
| 1,265,141 | A | 5/1918 | Trippe |
| 1,447,456 | A | 3/1923 | Wright |
| 1,520,716 | A | 12/1924 | Judd |
| 1,530,713 | A | 3/1925 | Clark |

(Continued)

OTHER PUBLICATIONS

Makogear; "Glock Cocking Handle"; retrieved on Apr. 12, 2010 from http://www.makogear.com/store/index.php/weapons/glock/glock-cocking.

(Continued)

*Primary Examiner* — Stephen M Johnson
*Assistant Examiner* — John D Cooper
(74) *Attorney, Agent, or Firm* — Robert H. Frantz (57) ABSTRACT

At least one cam lock and an opposing structure form a compression channel for receiving and engaging a pistol slide. When the pistol is moved in a certain direction through the compression channel, the one or more cam locks and opposing structure engage the pistol's slide and translate some of the forward motion force into a compressive force on the sides of the slide. At a point where the compressive force overcomes the force of the main spring of the pistol, the pistol frame driven by the user moves forward relative to the slide, thereby racking the slide of the pistol.

20 Claims, 13 Drawing Sheets

(56) References Cited

U.S. PATENT DOCUMENTS

| | | | |
|---|---|---|---|
| 1,544,225 | A | 6/1925 | Barros |
| 1,767,732 | A | 6/1930 | Breadon |
| 1,772,673 | A | 8/1930 | MacDonald |
| 1,792,923 | A | 2/1931 | O'Neil |
| 1,806,844 | A | 5/1931 | Dennis |
| 1,823,412 | A | 9/1931 | Schwarze |
| 2,036,482 | A | 4/1936 | Larson |
| 2,254,579 | A | 9/1941 | Okie |
| 2,287,985 | A | 6/1942 | Gookin |
| 2,444,841 | A | 7/1948 | Meronk |
| D166,328 | S | 4/1952 | Maring |
| D170,787 | S | 11/1953 | Wood |
| 2,845,673 | A | 8/1958 | Weis |
| 2,967,340 | A | 1/1961 | Pernecky, Jr. |
| 2,991,526 | A | 7/1961 | Kuebler |
| 3,078,535 | A | 2/1963 | Hedderich |
| 3,108,385 | A | 10/1963 | Teufel |
| 3,112,545 | A | 12/1963 | Williams |
| 3,265,032 | A | 8/1966 | Hume |
| 3,279,015 | A | 10/1966 | Henning |
| 3,333,304 | A | 8/1967 | Daddona, Jr. |
| 3,490,156 | A | 1/1970 | Lollman et al. |
| D224,584 | S | 8/1972 | Parpaiola et al. |
| 3,703,775 | A | 11/1972 | Gatti |
| 3,730,129 | A | 5/1973 | Helms |
| 3,744,105 | A | 7/1973 | Laurita |
| 3,750,611 | A | 8/1973 | Field |
| 3,758,922 | A * | 9/1973 | Field .......................... 24/136 R |
| 3,765,061 | A * | 10/1973 | Nash ............................ 24/134 P |
| 3,795,218 | A | 3/1974 | Merry |
| 3,808,644 | A | 5/1974 | Schoch |
| 3,815,538 | A | 6/1974 | Jurgich |
| 3,834,048 | A | 9/1974 | Maurer |
| 3,936,914 | A | 2/1976 | Mancini |
| D247,217 | S | 2/1978 | Merry |
| 4,071,964 | A | 2/1978 | Vogiatzis |
| 4,084,532 | A * | 4/1978 | Feder ............................ 114/218 |
| 4,092,941 | A | 6/1978 | Gryglas |
| 4,134,499 | A * | 1/1979 | Joswig ............................ 211/66 |
| 4,217,847 | A | 8/1980 | McCloud |
| 4,278,042 | A | 7/1981 | Lindquist |
| 4,348,974 | A * | 9/1982 | Lerner ........................... 114/218 |
| 4,397,253 | A * | 8/1983 | Uecker et al. ................. 114/218 |
| 4,414,910 | A | 11/1983 | Renton |
| 4,453,486 | A * | 6/1984 | Harken .......................... 114/218 |
| 4,553,495 | A | 11/1985 | Lerner |
| 4,620,499 | A | 11/1986 | Slemmons |
| 4,633,548 | A | 1/1987 | Siskind et al. |
| 4,640,025 | A | 2/1987 | DeRenzo |
| 4,660,493 | A | 4/1987 | Lowry, III |
| 4,727,627 | A | 3/1988 | Baggio et al. |
| 4,766,835 | A | 8/1988 | Randall |
| 4,807,333 | A | 2/1989 | Boden |
| 4,843,687 | A | 7/1989 | Kroepelin, Jr. |
| 4,899,423 | A | 2/1990 | Randall |
| 4,907,352 | A | 3/1990 | Ginsberg |
| 4,916,833 | A | 4/1990 | Nwoko |
| 4,956,897 | A | 9/1990 | Speedie |
| 5,070,805 | A | 12/1991 | Plante |
| 5,133,111 | A | 7/1992 | Brown |
| 5,158,428 | A | 10/1992 | Gessner et al. |
| 5,177,882 | A | 1/1993 | Berger |
| 5,181,331 | A | 1/1993 | Berger |
| 5,205,055 | A | 4/1993 | Harrell |
| 5,333,398 | A | 8/1994 | Seo |
| 5,335,401 | A | 8/1994 | Hanson |
| 5,345,697 | A | 9/1994 | Quellais |
| 5,349,764 | A | 9/1994 | Posner |
| 5,467,511 | A | 11/1995 | Kubo |
| 5,526,585 | A | 6/1996 | Brown et al. |
| 5,537,763 | A | 7/1996 | Donnadieu et al. |
| D373,464 | S | 9/1996 | Hnarakis |
| 5,566,474 | A | 10/1996 | Leick et al. |
| D375,831 | S | 11/1996 | Perry |
| D377,114 | S | 1/1997 | Crowley et al. |
| 5,640,785 | A | 6/1997 | Egelja |
| 5,647,104 | A | 7/1997 | James |
| 5,755,044 | A | 5/1998 | Veylupek |
| 5,784,979 | A | 7/1998 | Nelson, III |
| 5,848,457 | A | 12/1998 | Silagy |
| 5,852,853 | A | 12/1998 | Pennoyer, Jr. |
| D405,601 | S | 2/1999 | Zebe, Jr. |
| D405,602 | S | 2/1999 | Zebe, Jr. |
| 5,906,057 | A | 5/1999 | Borsoi |
| 5,909,947 | A | 6/1999 | DeMarchi |
| 5,926,976 | A | 7/1999 | Cretinon et al. |
| 5,931,112 | A | 8/1999 | Lacan |
| 5,940,990 | A | 8/1999 | Barret |
| 5,956,823 | A | 9/1999 | Borel |
| 5,966,841 | A | 10/1999 | Barret |
| 5,979,080 | A | 11/1999 | Borsoi |
| 5,996,256 | A | 12/1999 | Zebe, Jr. |
| D422,530 | S | 4/2000 | Zebe, Jr. |
| D426,952 | S | 6/2000 | Zebe, Jr. |
| D435,719 | S | 1/2001 | Zebe, Jr. |
| 6,178,604 | B1 | 1/2001 | Pennoyer, Jr. |
| D440,036 | S | 4/2001 | Zebe, Jr. |
| D440,395 | S | 4/2001 | Zebe, Jr. |
| D440,759 | S | 4/2001 | Zebe, Jr. |
| 6,324,774 | B1 | 12/2001 | Zebe, Jr. |
| D460,858 | S | 7/2002 | Zebe, Jr. |
| D462,163 | S | 9/2002 | Zebe, Jr. |
| 6,505,384 | B1 | 1/2003 | Renton et al. |
| 6,722,303 | B2 | 4/2004 | Lob et al. |
| 6,857,381 | B2 | 2/2005 | Siewert et al. |
| 7,287,304 | B2 | 10/2007 | Zebe |
| 2007/0137003 | A1 | 6/2007 | Zebe |
| 2011/0283587 | A1 | 11/2011 | Sharp et al. |

OTHER PUBLICATIONS

Heinie; "#4095 Heinie M&P LEDGE Straight Eight Night Sight Set"; retrieved on Feb. 25, 2011 from http://www.heinie.com/popup_image.php?pID=169.

crimsonsguns.com; "Firearms in Aninne"; retrieved on Apr. 8, 2010 from http://crimsonsguns.tripod.com/animeguns.html.

Heinie; "Heinie Specialty Products-Ledge" retrieved on Feb. 25, 2011 from http://www.heinie.com/information.php?info_id=9.

Gunsamerica; "Kimber SIS Pro 45 Pistol w/Night Sights-LNIB-20190"; retrieved on Feb. 25, 2011 from http://www.gunsamerica.com/933953412/Guns/Pistols/Kimber-of-America.

Usconcealedcarry; "Choosing to Carry a Weapon While Having Physical Disabilities"; retrieved from http://www.usconcealedcarry.com/downloads/reports/pdf/disabilities.pdf on Feb. 22, 2011 with membership in USCCA.

Census;"Population Profile of the United States-Disability" retrieved on Mar. 2, 2011 from http://www.census.gov/population/www/pop-profile/disabil.html.

Forum':The M1911 Pistols Organiztions Forums Site retrieved on Feb. 25, 2011 from http://forum.m1911.org/archive/index.php/t-72886.html.

USPTO & Sharp et al.; examination documents from related U.S. Appl. No. 13/197,974, including office action mailed on Sep. 11, 2012, applicant's reply to office action, and Notice of Allowance mailed on Jan. 10, 2013.

* cited by examiner

*Prior Art*

Prior Art

PISTOL COCKING ASSISTIVE DEVICE

CROSS-REFERENCE TO RELATED APPLICATIONS

This is a continuation of U.S. patent application Ser. No. 13/197,974, filed on Aug. 4, 2011 by Lawrence C. Sharp, et al., which is currently under notice of allowance.

FEDERALLY SPONSORED RESEARCH AND DEVELOPMENT STATEMENT

Not applicable.

MICROFICHE APPENDIX

Not applicable.

INCORPORATION BY REFERENCE

The related patent application Ser. No. 13/197,974, filed on Aug. 4, 2011 by Lawrence C. Sharp, et al., is hereby incorporated by reference in its entirety.

BACKGROUND OF THE INVENTION

1. Field of the Invention

This invention relates to the arts of assistive devices for operating a handgun, and especially to devices for allowing single-handed cocking of pistols having a slide.

2. Background of the Invention

Figure 1:
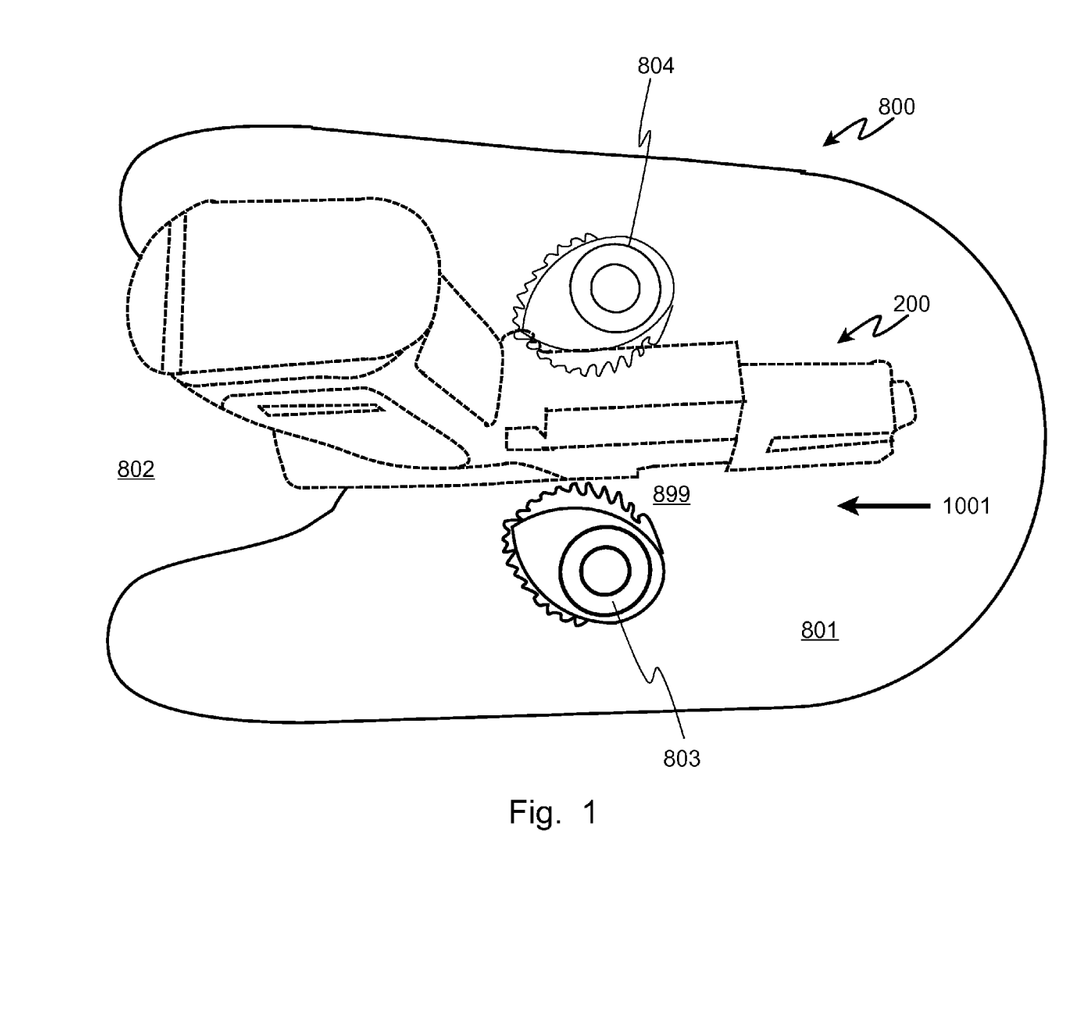
FIG. 1 illustrates an embodiment according to the invention during a period in which a pistol is captured into the compression channel.
Figure 2:
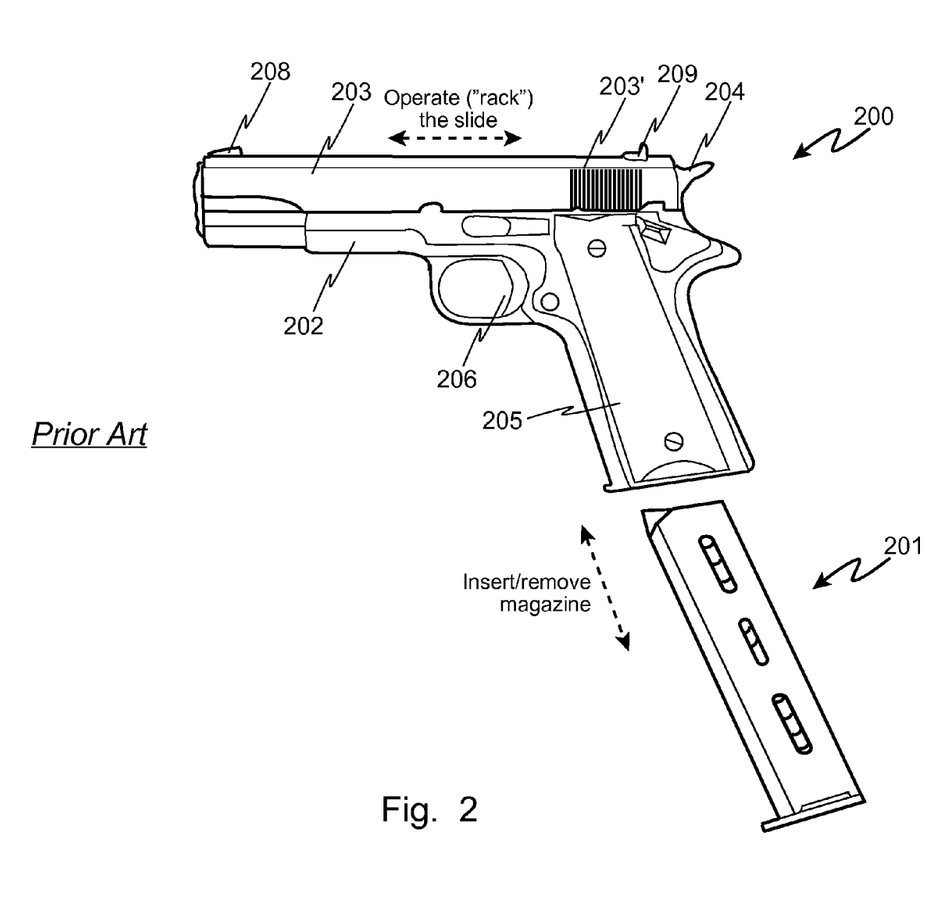
FIG. 2 depicts a typical auto-loader pistol and magazine.

In FIG. 2, a depiction of a typical semi-automatic pistol is shown. Such a pistol is an "automatic loader" (e.g. after each pull of the trigger, a spent round is automatically ejected and a fresh round is automatically chambered), and may be a semi-automatic firing pistol (e.g. each pull of the trigger results in only one round being fired) or may be a fully-automatic firing pistol (e.g. each pull of the trigger may result in multiple rounds being fired).

The pistol (200) has a frame (202) with a grip (205) portion which receives a magazine (201) carrying ammunition. The pistol (200) also has a slide (203) which has a slide grip (203') for manually grabbing the slide using a thumb and finger (or palm) to pinch it on opposing sides. The slide grip (203') usually consists of a series of grooves or channels machined into the metal of the slide so as to enhance the ability to grasp the metal slide, especially when the pistol may be wet or dirty. The slide usually has a front sight (208) and a rear sight (209) provided for aiming the pistol.

Operating (e.g. racking) the slide (203) by pulling it to the rear of the pistol typically ejects a round or shell casing which may be already in the chamber and cocks the hammer (204). Allowing the slide (203) to move forward to its "battery" position (as shown) usually strips the top round from the magazine (201) and pushes the fresh round into the chamber, placing the pistol in a condition ready to fire by pulling the trigger (206) (if a safety is not engaged). This racking operation is required each time a new magazine is inserted into the pistol if (a) the slide has not locked in an open position (e.g. due to running empty or being opened and locked manually for inspection or cleaning), and (b) there is not a live unspent round currently in the chamber (e.g. tactical or hot reload).

Figure 3:
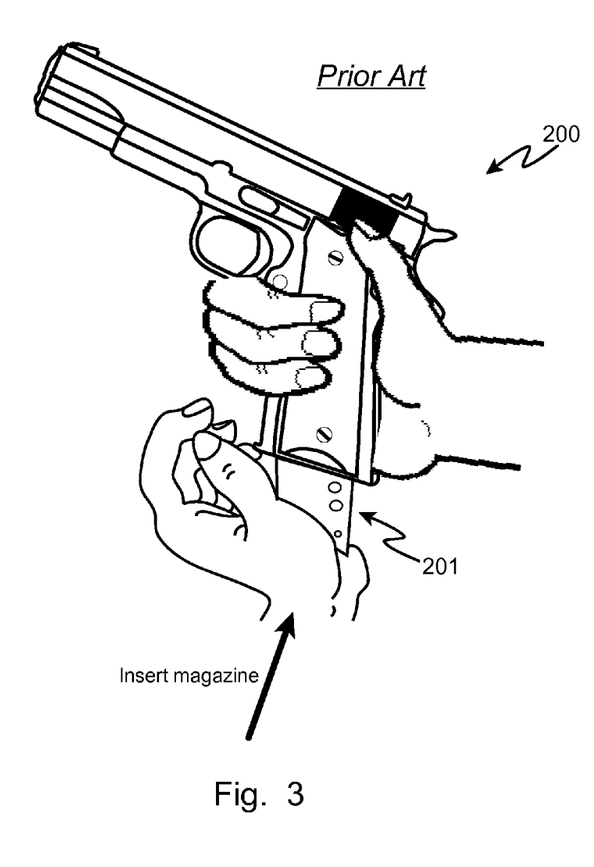
FIG. 3 illustrates the loading of a magazine into the pistol of FIG. 2.
Figure 4:
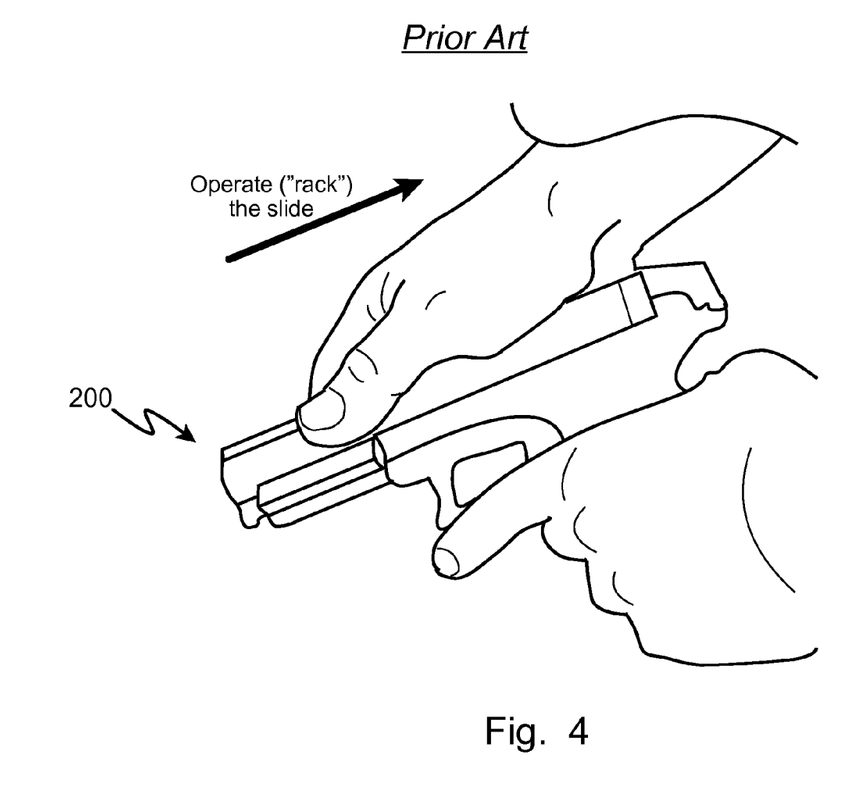
FIG. 4 shows typical hand motions to rack a slide of a pistol.

After loading the magazine as shown in FIG. 3, and racking the slide, each firing of the pistol will result in some portion of the energy from the detonation forcing the slide backwards to automatically eject the spent casing, followed by the slide returning forward automatically to load a fresh round from the magazine into the chamber.

The action to return the slide to the forward, "in battery" position is driven by an internal main spring (not shown), which can provide a forward-biasing force of several pounds. Some pistols have a "locking breech", which means that a mechanical interlock holds the slide forward during the detonation of the powder in the chambered round. Other pistols have a non-locking breech. In the former case, the main spring may be of several pounds of forward biasing force, while in the latter case, the main spring may be much stronger so as to also keep the breech closed during firing.

In either configuration (locking or non-locking), the main spring's force must be overcome by the user when pulling the slide back to load a round from the magazine. This requires the user to have the dexterity and grip strength to pinch the slide grip (203') with enough force to maintain a hold on it, and requires the user to have enough arm strength to pull the slide backwards. For a two-handed user, one hand is used to hold the pistol by the grip (205), while the other hand is used to rack the slide (203) rearward while pinching the slide grip (203').

SUMMARY OF THE DISCLOSED EMBODIMENTS OF THE INVENTION

At least one cam lock and an opposing structure form a compression channel for receiving and engaging a pistol slide. When the pistol is moved in a certain direction through the compression channel, the one or more cam locks and opposing structure engage the pistol's slide and translate some of the forward motion force into a compressive force on the sides of the slide. At a point where the compressive force overcomes the force of the main spring of the pistol, the pistol frame driven by the user moves forward relative to the slide, thereby racking the slide of the pistol.

BRIEF DESCRIPTION OF THE DRAWINGS

The following detailed description when taken in conjunction with the figures presented herein provide a complete disclosure of the invention.

FIG. 9 illustrates a side or end-on view of the embodiment of FIG. 8a.

FIG. 10 illustrates placing a pistol slide into the compression channel of the embodiment of FIG. 8a.

FIG. 11 shows actual use of a prototype of the embodiment of FIG. 8a.

DESCRIPTION OF THE INVENTION

The present inventors have recognized a problem in the art not yet fully satisfied by available pistols and their accessories (e.g. holsters, belt attachments, etc.). Persons who only have one strong hand find it very difficult, if not impossible, to safely and effectively operate a pistol as previously described. These people may have only one strong hand due to a birth limitation, injury (work related, combat, etc.), or disease (arthritis, carpal tunnel syndrome, osteoporosis, etc.) These persons may be "long term" single-handed in that their limiting condition may be known in advance of a real-time need to use and operate a pistol.

Other persons, however, may enter into a real-time situation as a two-handed user and may become a one-handed user during the situation. For example, a soldier or law enforcement officer may enter into a situation during which a hand, arm or shoulder is injured, rendering him or her as a one-handed user for at least the rest of the situation. Or, a soldier or law enforcement officer may have a hand or arm immobilized or otherwise occupied during the situation, such as by having to use one hand to carry ammunition, supplies, drag an injured comrade, hold onto a rope or ladder, or having an arm or hand pinned or caught. In such situations, a normally two-handed person may find themselves in dire need to reload their pistol single-handedly.

Available Assistive Devices

Figure 5:
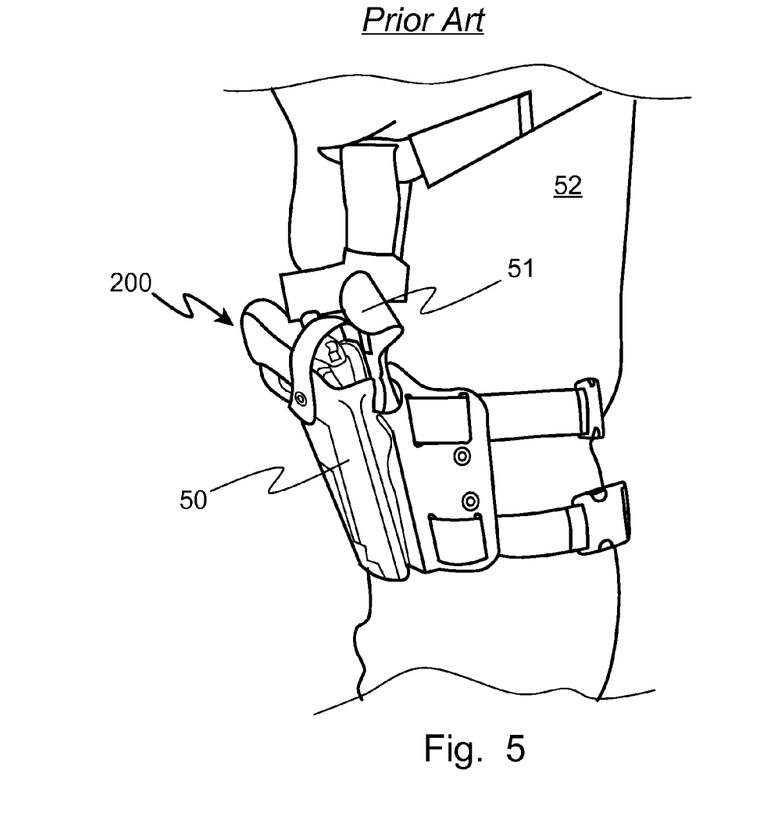
FIG. 5 depicts a known device for single-handedly cocking a pistol by engaging the rear sights of the pistol with a relatively stable structure attached to the holster system.
Figure 6A:
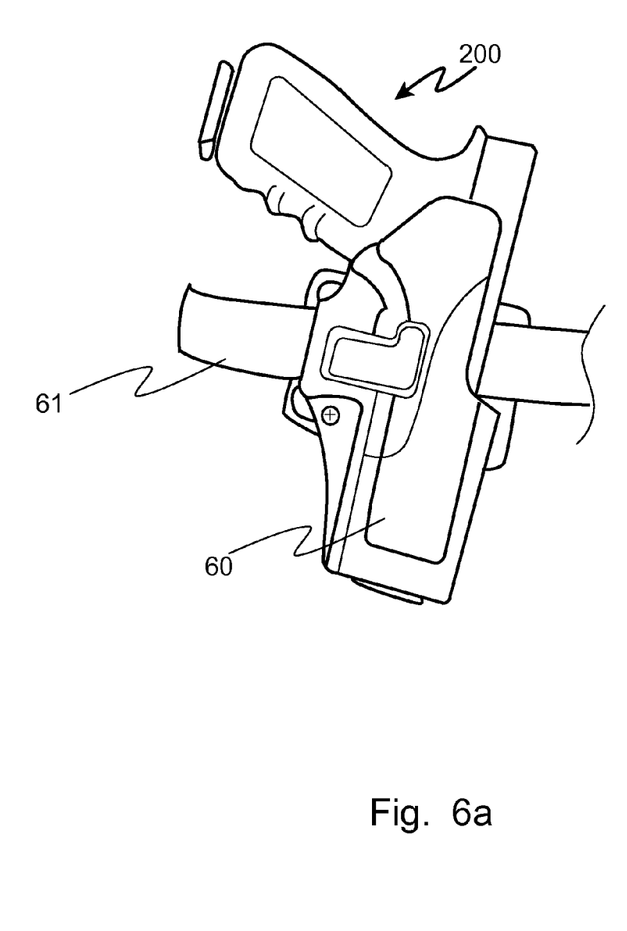
FIG. 6a shows a typical belt-worn holster.
Figure 6B:
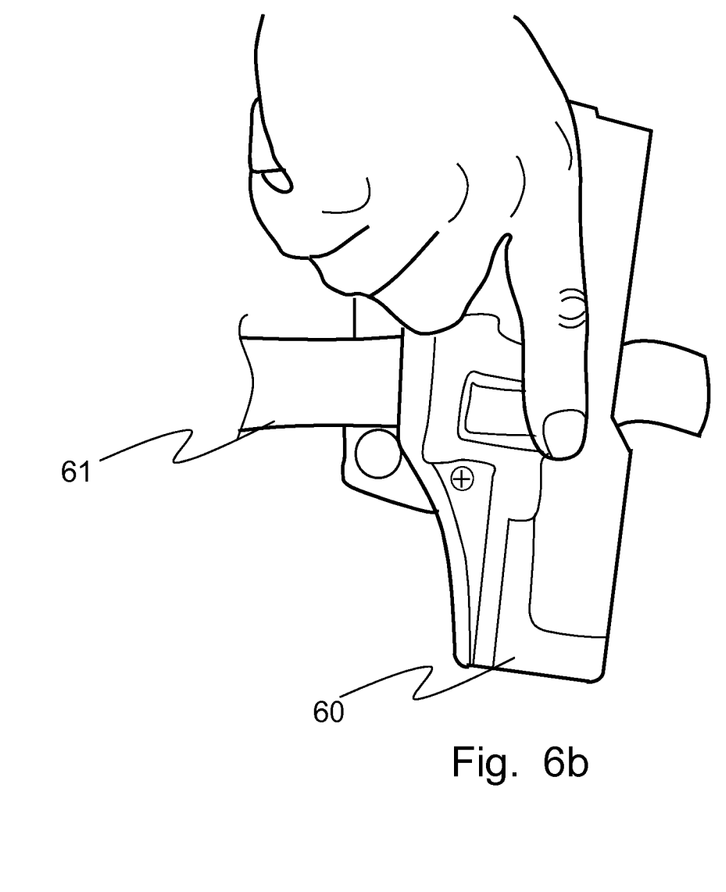
FIG. 6b shows a typical hand position for drawing a pistol from such a holster.

Known solutions to allowing single-handed reloading of a pistol involve several which have shortcomings. In FIG. 5, a holster (50) is shown which is worn on the thigh (52) (e.g. a thigh rig) of the user. A semi-rigid plastic arch (51) is provided at the top of the holster which allows for the slide of the pistol to be actuated by snagging or catching a portion of the slide, such as the rear sight, on the top (rear) edge of the arch, and then driving the pistol forwards through the arch, thereby forcing the slide rearwards relative to the pistol frame. Such a single-handed cocking assistance device may be effectively limited to only certain pistol models which have slide dimensions that properly mate to the arch—slimmer pistols may not be operated correctly, and wider models may not fit into the arch at all. Further, many pistol models have "snag free" sights which are tapered or sloped in their edge designs to prevent their snagging on clothing or other equipment, and by default, would be difficult or impossible to cooperate with the cocking arch of this special holster design. And, many carry styles, such as a belt-worn holster, do not allow for such a plastic arch to protrude from the holster, which might protrude into the side flesh of the wearer, such as a belt-worn holster as shown in FIG. 6a and the associated drawing grip as shown in FIG. 6b.

Other solutions include a small handle which is mounted to the rear of the slide near the hammer and protrudes to the left or right of the slide (e.g. Glock); a specially designed rear sight which presents an exaggerated front edge which is to be snagged or caught on an edge of pants pocket, shoe heel, or belt edge; and a specially designed trigger guard which includes a mechanism that can be squeezed backwards to move the slide backwards. The first of these three (the handle) can cause a mechanical interference of the handle with holsters, holster flaps and retention straps, and it is only effective for pistols specifically equipped with the handle. The second of these three options (the high profile rear sight) can present a snagging risk (by design) and also is only effective for pistols specifically equipped with the special sight device.

The third of these options (the modified trigger guard) also is only effective for specific models of pistols, and could pose a serious challenge to operate due to the squeezing forced needed to overcome the main spring. It should also be born in mind that any cocking system which engages the front or rear sights may move the sights out of alignment, especially adjustable sights, thereby reducing the pistol's effectiveness as a defensive or offensive weapon.

Evidence of Unfulfilled Need in the Art

There is ample evidence that a substantial number of U.S. citizens have reduced use of a hand or arm. According to a report written by John McNeil for the U.S. Census Bureau, about 49 million U.S. citizens have some sort of disability, equating to about 19.4% of the total population. When considered in age brackets, it is obvious that disability increases with age, wherein only 5.8% of children have a disability, this increased to 29.2% for middle aged Americans, and goes on to 53.9% for persons over 65 years old. Considering only those who might have a hand or arm disability that might affect the ability operate a pistol, the data suggests that this segment of the population as high as 9.2 million—2 million with leg, foot, hand, or arm, and about 7.2 million with arthritis or rheumatism, although the data is not clear if some persons appear in both categories.

Some estimates show that about 40% of American households have a gun of some type (rifle, pistol, shotgun, etc.) in them, and that about 35% of these guns are handguns of some sort (pistols and revolvers). Without consideration that some "households" comprise of multiple persons with an arm or hand limitation, one calculation shows that as many as 1.28 million Americans own a handgun and have an arm or hand limitation (40% of 35% of 9.2 million).

From a marketing perspective, a 10% capture of any available market would be considered successful, meaning in this market space that producing and selling 920 thousand units would be a worthy goal. Yet, when one visits any random gun store or sporting goods store, it is difficult if not impossible to find any of the aforementioned assistive devices.

The present inventors submit that it is for these reasons that the common wisdom in handgunning is that single-handed users should rely on revolvers, and not on semi-automatic pistols, for their sporting and defense needs. For example, Concealed Carry Magazine produced a guide to carrying a pistol for those with disabilities in February of 2011, in which the required strength to manipulate a pistol slide was considered prohibitive for disabled persons. This may be a viable approach for those who know in advance that they are or will be single-handed users, but this is not a good solution for those who become single-handed users in a situation, or who need the higher ammunition capacity of a pistol.

As indicated by this data and by these extrinsic opinions of experts in the art, even though a clearly demonstrated market exists, a solution to the challenge and problem of providing a universally usable cocking assistive device, usable across a wide variety, sizes, and configuration of pistols, without requiring modification or attachment of any devices onto specific pistols, is non-obvious to everyone already involved in the art.

The Universal Pistol Cocking Assistive Device

To this end, the present inventors set out to develop a device which did not present the aforementioned limitations of use with a specifically equipped pistol or specific model pistol, and which would allow for safe, effective pistol slide operation using just one hand. Two initial designs which relied upon some sort of friction with the slide were not reliably operative because of the wide variety of finishes on slides—some are extremely slick (chromed and stainless steel), while others were less slick (blued finishes). The example configurations shown in this description are the results of the successful re-design and testing of several prototypes.

Figure 7:
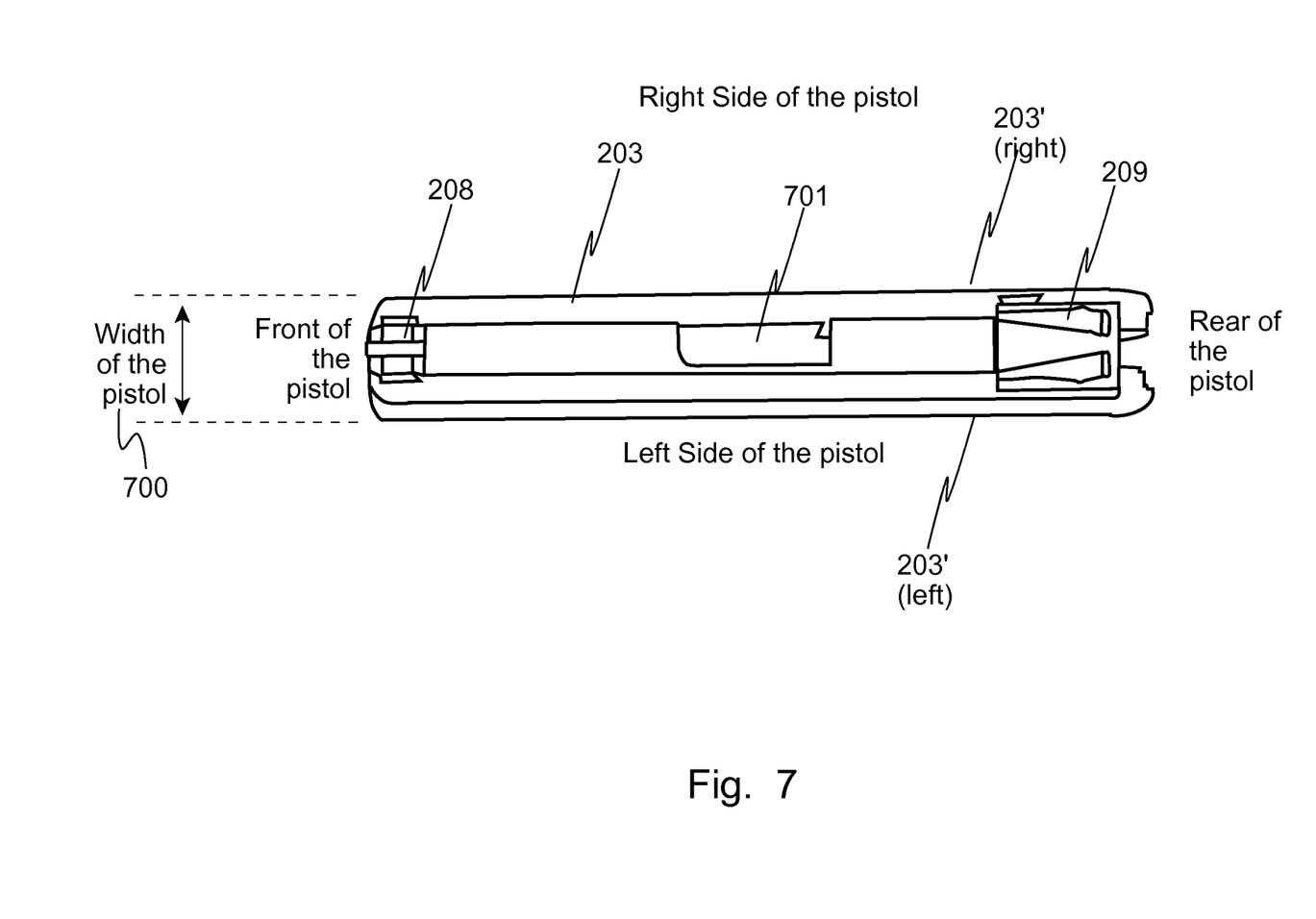
FIG. 7 depicts a pistol slide from a top-down perspective.

For reference in the description of the present invention, a top view of a pistol slide (203) is shown. This particular example shows an ejection port (701), but not all models have exactly this configuration. For reference, we will refer to the muzzle end of the slide as the "front" of the pistol, the hammer end of the slide as the "rear" of the pistol, with a left side of the pistol and a right side of the pistol as shown. Thus, the slide grip actually has two portions, a left portion (203' left) and an opposing right portion (203' right), which must be gripped by the user in order to rack the slide (203). The width (700) of the pistol will be referred to as the distance from the right side of the slide to the left side of the slide, with the caveat that such distances are often approximate due to tapering and/or rounding of the actual slide shape.

Figure 8A:
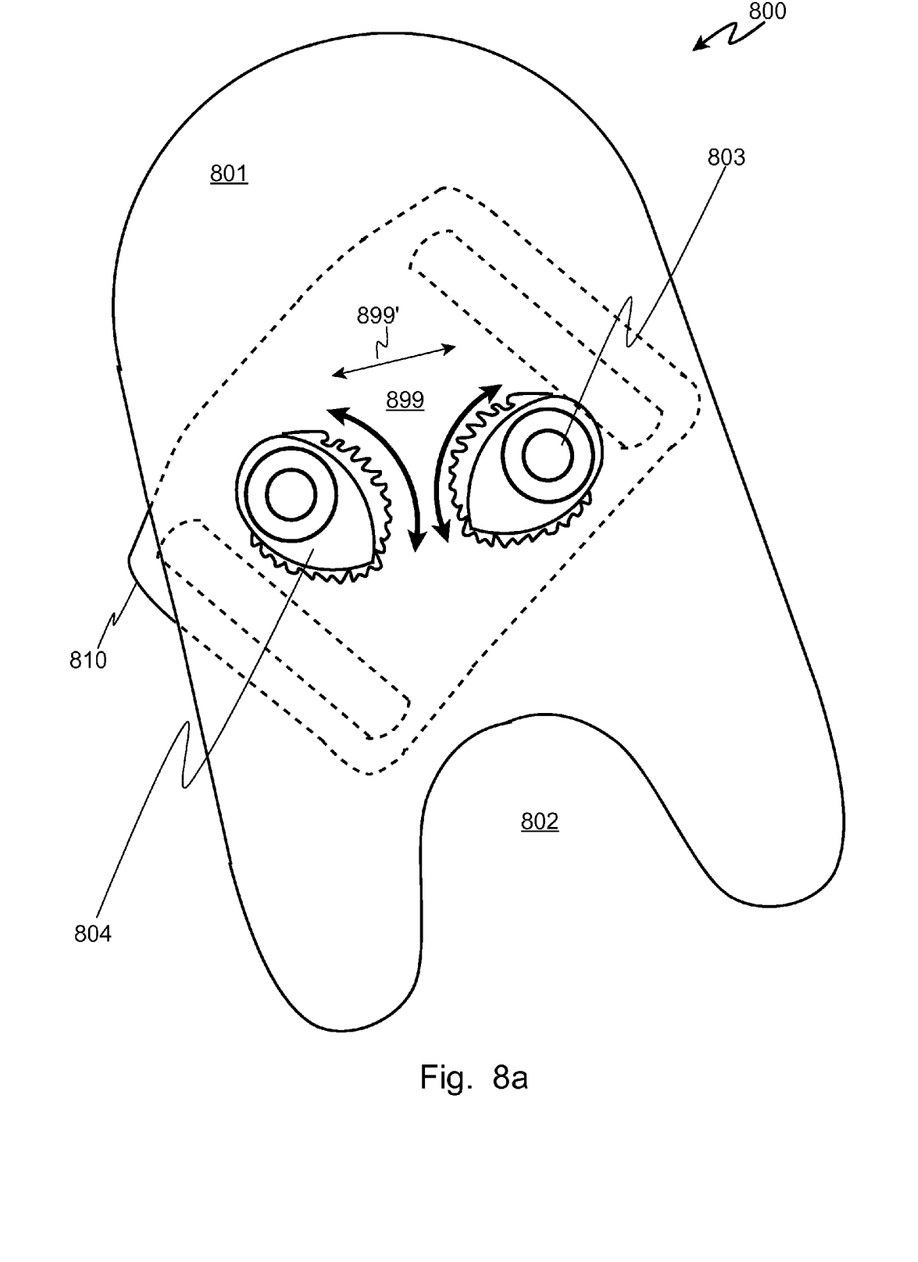
FIG. 8a shows a first embodiment according to the invention having two locking cams.
Figure 8B:
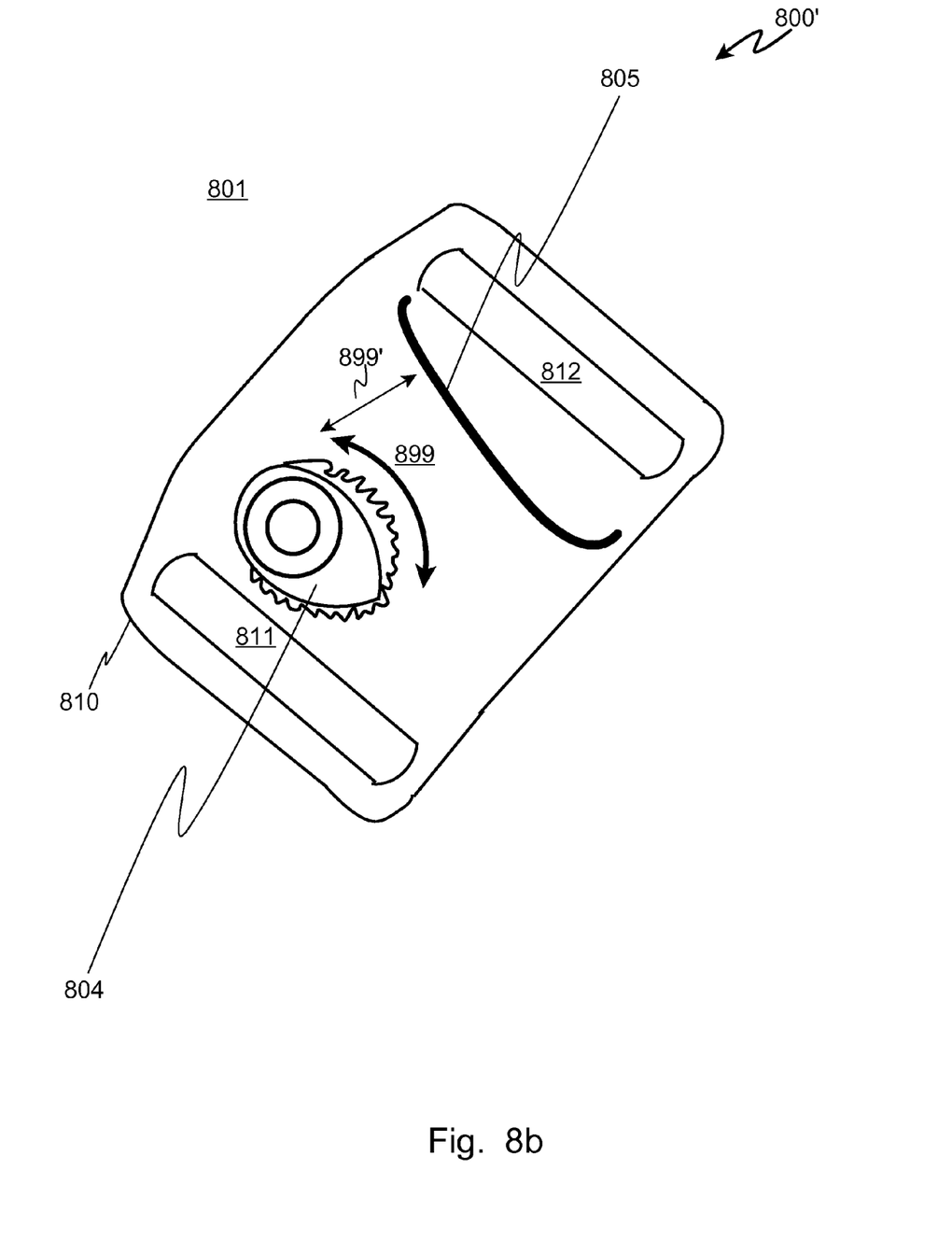
FIG. 8b shows a second embodiment according to the invention having one locking cam and an opposing wall structure.

Turning to FIG. 8a, an embodiment according to the invention for a single-handed pistol cocking assistive device (800) is shown from a top view. This embodiment includes a base plate (801) provided with a pair of counter-rotating cam locks (804, 803). Between the cam locks (803, 804) is formed a compression channel (899) of varying width (899') for receiving and engaging a slide of a pistol. Optionally, the base plate may be provided with a void (802) for receiving but not necessarily engaging the rear sights of a pistol. Alternative embodiments may omit the base plate, and may include just one rotating cam lock opposing a mechanical guide structure (805) as shown (800') in FIG. 8b. These example embodiments are attached to a belt slide (810) for attaching the assistive device (800, 800') to a belt (a belt is passed through slots 811 and 812). Alternatively, it may be attached to other points such as Molle webbing on protective vests, back packs, and thigh rigs, or to other common attachment devices such as a holster paddle.

Figure 9:
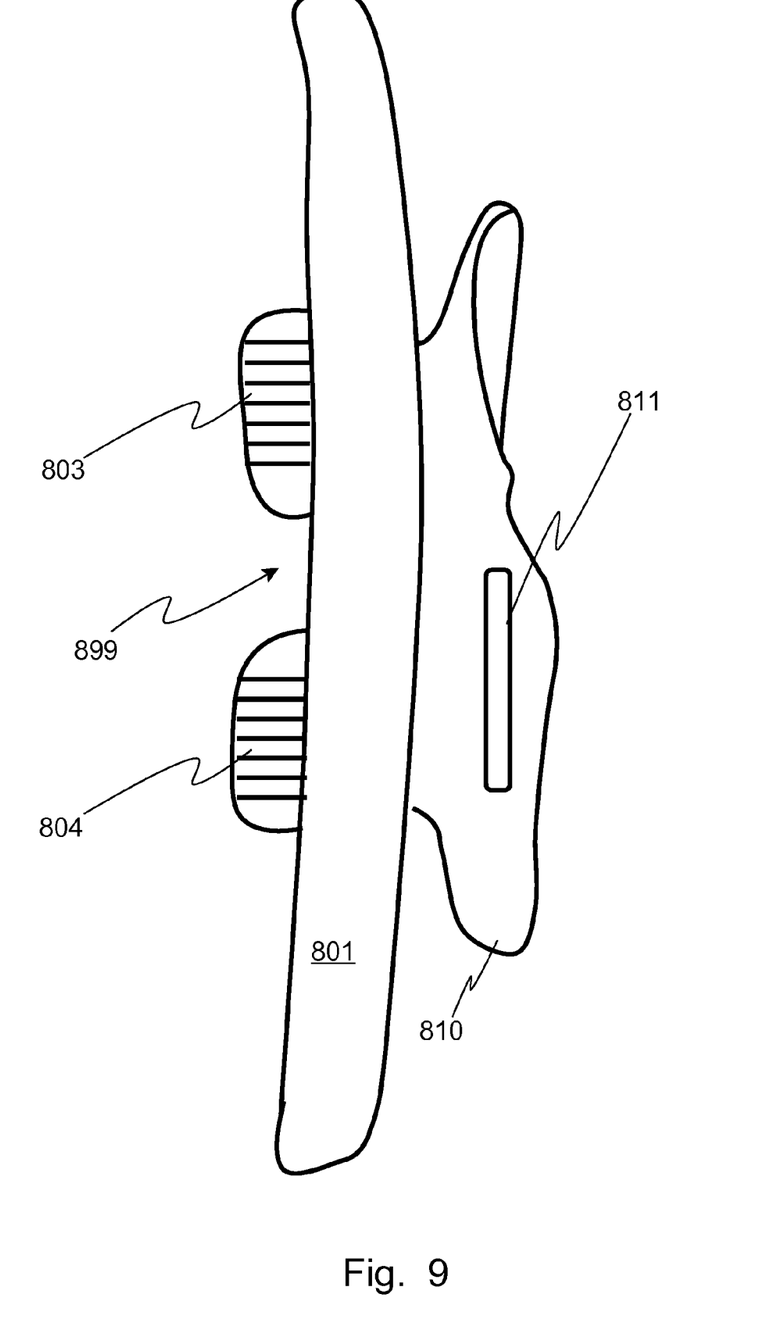

Referring now to FIG. 9, an end view of the embodiment of FIG. 8a (dual cam lock version) is shown, in which the opposing cam locks (803, 804) form a compression channel (899) for receiving and engaging the slide of a pistol, and a base plate (801) is mounted to a belt slide (810).

Figure 10:
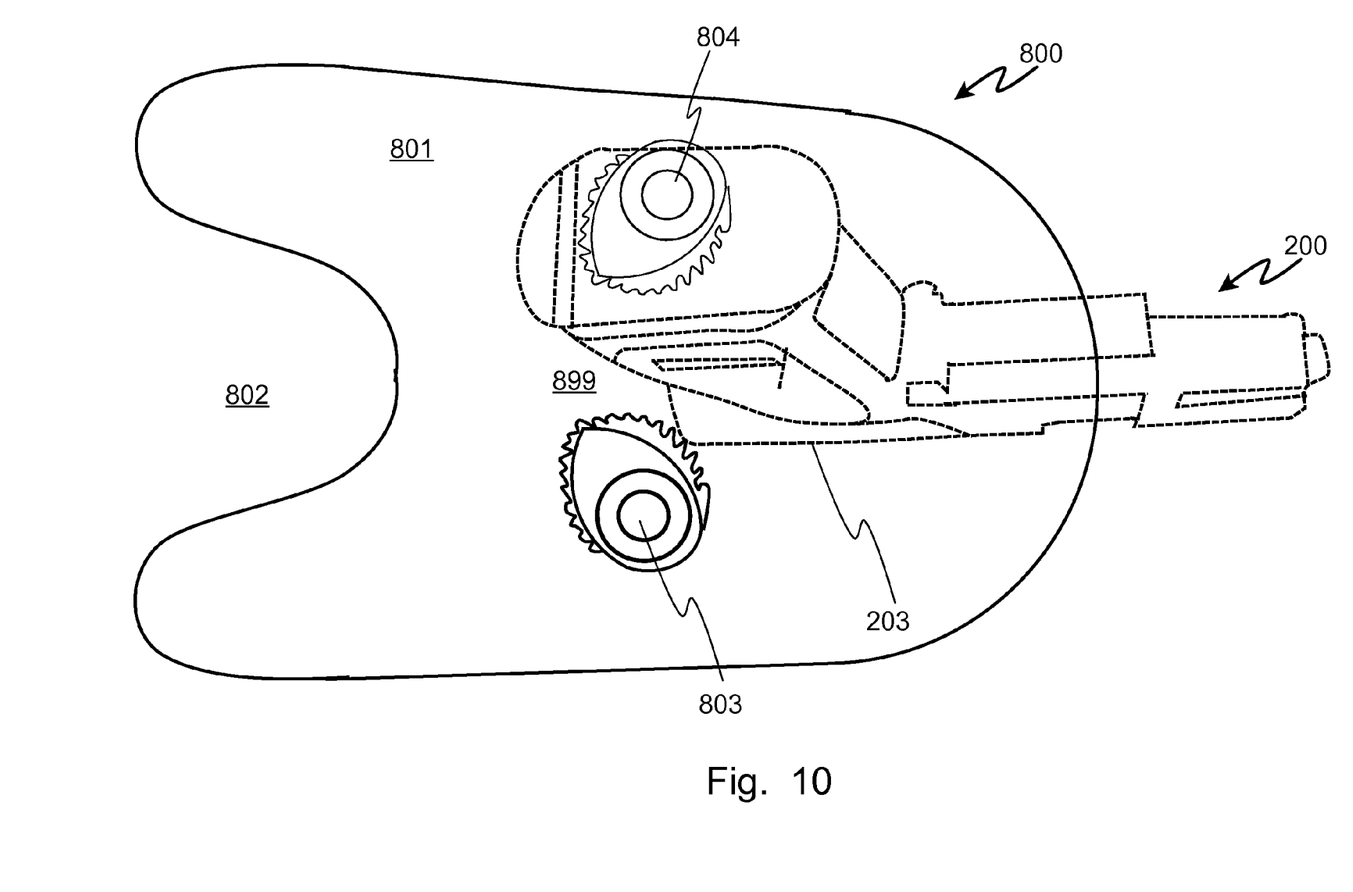

Now describing FIG. 10, a manner of use of the embodiment of FIG. 8a is illustrated, in which a pistol (200) is inverted so as to place the slide (203) into the front of the compression channel (899). This action can be completed single-handedly. Next, the pistol (200) is moved rearward (1001) while pressing the slide lightly against the base (801), so as to pass the slide into the compression channel (899). The cam locks (803, 804) are frictionally engaged during this motion against the sides of the slide, and are rotated from a closed position (minimum channel width 809') to a partially open position approximately the width of the pistol slide (700).

Figure 11:
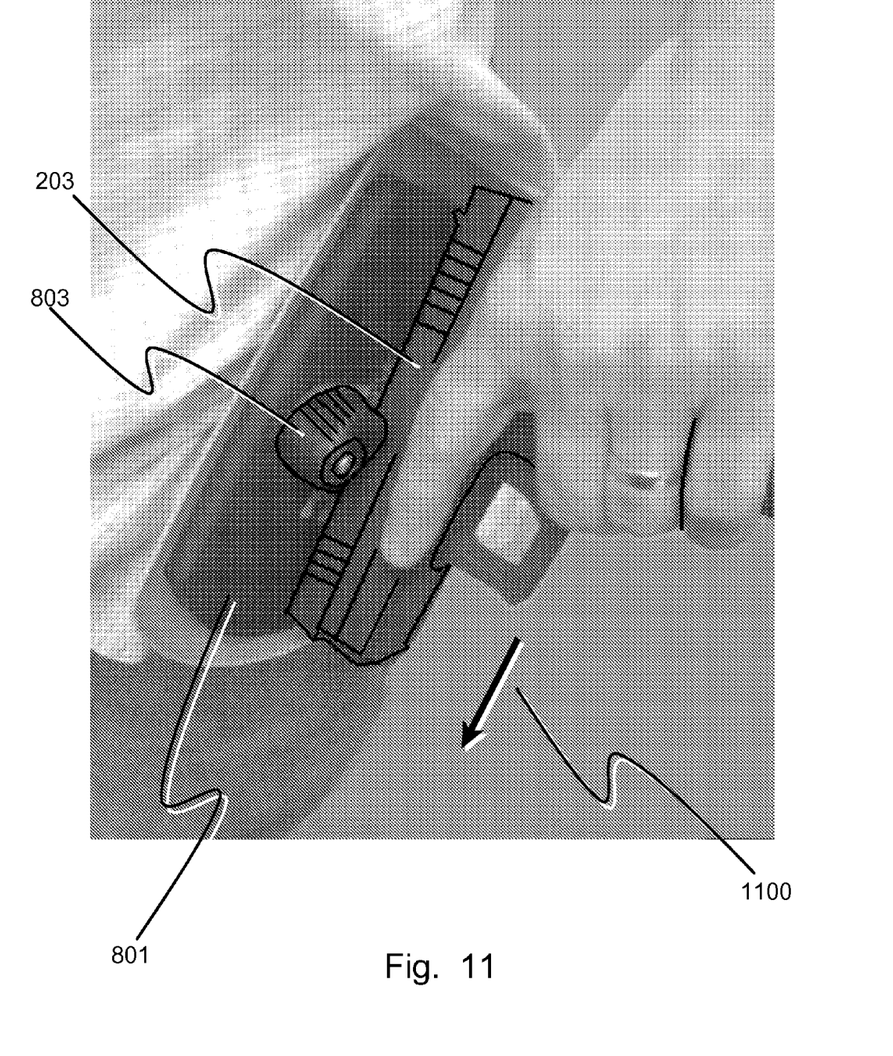

Next, the pistol is driven forward (1100) towards the front of the assistive device (800), causing the slide (203) to be frictionally engaged with compressive force on both sides of the slides in the compression channel (899) as shown in FIG. 11. As the pistol moves forward, this compression force increases until the slide is captured and stopped from further movement. As the pistol is moved even forward, the force of the main spring is overcome, and the frame of the pistol begins to move forward while the slide is held in place between the cam locks. This movement eventually reaches the mechanical limit of the slide's movement versus the frame, thereby racking the slide. Now, the user may simply pull the pistol out of the cam locks in a direction essentially perpendicular or tangential to the base or cam locks, which releases the slide from the cam locks and allows the slide to slam forwards, loading a round into the chamber. Alternatively, the user may reverse the direction of movement of the pistol frame to move towards the rear of the assistive device (800), until the slide is back in it's in-battery position.

Example Prototype and Test Results

The inventors prototyped such an assistive device with a compression channel minimum width of about 0.7 inches, and a maximum width of about 1.25 inches. The former corresponds to a slightly narrower spacing than the width of so-called "pocket pistols", such as the ultra-compact Kel-Tec P-3AT .380 caliber pistol, and the latter corresponding to the width of a Glock .45 caliber pistol, which is one of the widest pistols in mass use.

A commercially available sail boat cam cleat, similar to the Speedie device shown in U.S. Pat. No. 4,956,897 available from Ronstan, for ropes was cut in half and mounted on a rigid plastic base so that the minimum and maximum compression spacing would be met, with the spacing between the cam locks being much greater than that provided in its rope cleat form.

Further, a thin layer of high density foam was provided over the entire exposed surface of the base so as to avoid possible marring of the finish of the pistol. In practical testing, all sizes of pistols ranging from the small Kel-Tec to the large Glock, and models of intervening widths such as a Walther P22, a Wilson Combat 1911, and a Heckler & Koch P30L were found to successfully be cocked by the prototype 100% of the time.

CONCLUSION

Cam locks, and their ability to transform linear force into compressive force, are well understood in certain arts, such as sail boat cleats and materials handling devices (e.g. shoe manufacturing, etc.). However, the present invention employs one or more cam locks in new and inventive ways to provide an assistive device for operating a pistol.

It will be recognized by those skilled in the art that the invention is not limited in scope to the specific example embodiments provided herein, as other cam devices, such as a sliding wedge cleat as taught by Field in U.S. Pat. No. 3,758,922, may be adapted into embodiments according to the present invention. It will also be recognized that addition of, omission of, or substitution of certain system components, such as the device for attaching the system to a wearer, are also within the range of embodiments of the invention. For example, besides belt slides, thigh rigs, and paddle attachments, optional embodiments may be configured to attach to an ankle rig, a wrist rig, a glove, a vest, a back pack, a waist pack, a carry bag, and a piece of furniture.

For these reasons, the scope of the present invention should be determined by the one or more claims.

We claim:

1. An assistive device for operating a slide portion of a pistol comprising:
   a first cam lock for receiving and frictionally engaging a first side of a slide portion of a pistol;
   a counter structure juxtaposed to the first cam lock forming a compression channel, wherein the compression channel ranges in a width from a minimum channel width to a maximum channel width during the frictional engagement, and wherein a height of the first cam lock is equal to or less than one half of the minimum channel width; and
   a cam lock position biasing device which holds the first cam lock in a first position producing the minimum channel width, wherein a slide portion of a pistol may be received in a first direction within the compression channel to engage a first side of the slide portion by the first cam lock and a second side of the slide portion by the counter structure thereby moving the first cam lock into a position producing a channel width greater than the minimum channel width and equal to or less than the maximum channel width thus engaging the first and second sides of the slide portion, and wherein a compressive force is applied between the first cam lock and the counter structure responsive to passing the slide portion in a direction opposite of the first direction through the compression channel.

2. The assistive device as set forth in claim 1 wherein the minimum channel width is about 0.70 inches.

3. The assistive device as set forth in claim 1 wherein the maximum channel width is about 1.50 inches.

4. The assistive device as set forth in claim 1 in which the first cam lock is a rotating cam lock.

5. The assistive device as set forth in claim 1 in which the first cam lock is a linear cam lock.

6. The assistive device as set forth in claim 1 in which the counter structure comprises at least one element selected from the group consisting of a rotating cam lock, a linear cam lock, and a surface juxtaposed to the first cam lock.

7. The assistive device as set forth in claim 6 in which the counter structure comprises a second cam lock, wherein the minimum channel width is produced with both cam locks in first positions, and wherein a height of the second cam lock is equal to or less than one half of the minimum channel width.

8. The assistive device as set forth in claim 7 in which the second cam lock comprises a rotating cam lock.

9. The assistive device as set forth in claim 7 in which the second cam lock comprises a linear cam lock.

10. The assistive device as set forth in claim 1 in which the counter structure comprises a wall having a surface juxtaposed to the first cam lock.

11. A method for producing an assistive device for operating a slide portion of a pistol, the method comprising:
   positioning a first cam lock and a counter structure juxtaposed to the first cam lock thereby forming a compression channel having a width ranging from a minimum channel width to a maximum channel, and wherein a height of the first cam lock is equal to or less than one half of the minimum channel width; and
   providing a cam lock position biasing device which holds the first cam lock in a first position producing the minimum channel width, wherein a slide portion of a pistol may be received in a first direction within the compression channel to engage a first side of the slide portion by the first cam lock and a second side of the slide portion by the counter structure thereby moving the first cam lock into a position producing a channel width greater than the minimum channel width and equal to or less than the maximum channel width thus engaging the first and second sides of the slide portion, and wherein a compressive force is applied between the first cam lock and the counter structure responsive to passing the slide portion in a direction opposite of the first direction through the compression channel.

12. The method as set forth in claim 11 wherein the minimum channel width is about 0.70 inches.

13. The method as set forth in claim 11 wherein the maximum channel width is about 1.50 inches.

14. The method as set forth in claim 11 in which the first cam lock comprises a rotating cam lock.

15. The method as set forth in claim 11 in which the first cam lock comprises a linear cam lock.

16. The method as set forth in claim 11 in which the counter structure comprises at least one element selected from the group consisting of a rotating cam lock, a linear cam lock, and a surface juxtaposed to the first cam lock.

17. The method as set forth in claim 16 in which the counter structure comprises a second cam lock, wherein the minimum channel width is produced with both cam locks in first positions, and wherein a height of the second cam lock is equal to or less than one half of the minimum channel width.

18. The method as set forth in claim 17 in which the second cam lock comprises a rotating cam lock.

19. The method as set forth in claim 17 in which the second cam lock comprises a linear cam lock.

20. The method as set forth in claim 11 in which the counter structure comprises a wall having a surface juxtaposed to the first cam lock.

\* \* \* \* \*